United States Patent [19]
Uesugi et al.

[11] Patent Number: 6,140,014
[45] Date of Patent: Oct. 31, 2000

[54] LITHOGRAPHIC PRINTING PLATE

[75] Inventors: Akio Uesugi; Kiyotaka Fukino, both of Shizuoka, Japan

[73] Assignee: Fuji Photo Film Co., Ltd., Minami-Ashigara, Japan

[21] Appl. No.: 08/961,882

[22] Filed: Oct. 31, 1997

[30] Foreign Application Priority Data

Nov. 8, 1996 [JP] Japan ................................ 8-296706

[51] Int. Cl.$^7$ ...................................................... G03F 7/09
[52] U.S. Cl. ........................ 430/278.1; 430/155; 428/141
[58] Field of Search ............................... 430/278.1, 155, 430/526; 428/141

[56] References Cited

FOREIGN PATENT DOCUMENTS

| 0414189 | 2/1991 | European Pat. Off. . |
| 0730979 | 9/1996 | European Pat. Off. . |
| 2118575 | 11/1982 | United Kingdom . |

*Primary Examiner*—Cynthia Hamilton
*Attorney, Agent, or Firm*—Burns, Doane, Swecker & Mathis, LLP

[57] ABSTRACT

A precursor for a lithographic printing plate having an aluminum support subjected to at least two graining treatments and simultaneously satisfying the ranges shown by following (1), (2), and (3);

$$1.5 \leq R_{ms}(10 \text{ to } 100 \text{ }\mu m)/R_{ms}(1 \text{ to } 10 \text{ }\mu m) \leq 3.0 \quad (1)$$

$$0.2 \leq R_{ms}(1 \text{ to } 10 \text{ }\mu m) \leq 0.4 \text{ }[\mu m] \quad (2)$$

$$0.4 \leq R_{ms}(10 \text{ to } 100 \text{ }\mu m) \leq 1.0 \text{ }[\mu m] \quad (3)$$

wherein the $R_{ms}$ is the square average surface roughness obtained by measuring the surface form of the support by the AFM, the $R_{ms}(1 \text{ to } 10 \text{ }\mu m)$ is the value about the frequency space of from 1 to 10 $\mu m$, and the $R_{ms}(10 \text{ to } 100 \text{ }\mu m)$ is the value about the frequency space of from 10 to 100 $\mu m$. The lithographic printing plate using the aluminum support has greatly improved various characteristics such as scumming, the printability, the printing impression, etc.

1 Claim, No Drawings

LITHOGRAPHIC PRINTING PLATE

FIELD OF THE INVENTION

The present invention relates to a lithographic printing plate and, particularly to a lithographic printing plate excellent in scumming and in the printing impression.

BACKGROUND OF THE INVENTION

As a support for a lithographic printing plate, an aluminum plate or an aluminum alloy plate (hereinafter, those are referred to as "aluminum plate") has hitherto been widely used.

To use the aluminum plate as the support for a lithographic printing plate, it is necessary that the aluminum plate has a proper adhesive property with a photosensitive material and a water-holding property and further is uniformly grained. In this case, the term "uniformly grained" means that the sizes of the pits formed are properly uniform and such pits are uniformly distributed on the whole surface.

Also, the pits give remarkable influences on the scumming, which is the printing impression of a printing plate, and the printing impression and the quality thereof are an important factor for producing printing plates.

As the graining method of an aluminum plate, there are a mechanical graining treatment, a chemical etching treatment, an electrochemical (or electrolytic) graining treatment, etc. For example, JP-A-6-2146 (the term "JP-A" as used herein means an "unexamined published Japanese patent application") describes a method of specifying various conditions in the mechanical graining treatment, the chemical etching treatment, and the electrochemical graining treatment. According to the above-described patent publication, it is proposed that after a mechanical graining treatment to an aluminum plate, a chemical etching treatment is applied to the aluminum plate such that the etched amount becomes from 0.5 to 30 g/m², an electrochemical graining treatment is applied to the aluminum plate at a proper current density and quantity of electricity, a chemical etching treatment is applied thereto in the range of the etched amount of from 0.1 to 10 g/m² to smoothly finish the corners of the unevenness formed in electrochemical graining of the previous step, and an anodic oxidation treatment is applied.

JP-A-7-137474 describes a brush suitable for a mechanical graining treatment.

JP-A-8-132751 describes an aluminum support which is subjected to graining treatments, a desmutting treatment, and an anodic oxidation treatment.

However, these supports for lithographic printing plates described above have a less water-holding amount and are liable to form ink staining and, in particular, to form stains at dot portions. Also, because these aluminum supports have a less water-holding amount, there are disadvantages that the surface of the printing plate is liable to shine, it is difficult to see water result at printing, and the control of water scale is difficult.

As described above, in conventional lithographic printing plates, there is a problem about the handling property in addition to the printing impression, and the further improvement of the scumming of a blanket and the printing impression has been required.

SUMMARY OF THE INVENTION

The present invention has been made under the above-described circumstances, and an object of the present invention is to provide a lithographic printing plate excellent in various characteristics such as the scumming, the printability, the printing impression, etc.

It has now been found that the above object is achieved by the present invention as set forth hereinbelow.

That is, the present invention provides a lithographic printing plate comprising a support for the lithographic printing plate, subjected to graining treatments in two or more steps, wherein the surface form of the support simultaneously satisfies the ranges shown by following (1), (2), and (3):

$$1.5 \leq R_{ms}(10 \text{ to } 100 \ \mu m)/R_{ms}(1 \text{ to } 10 \ \mu m) \leq 3.0 \quad (1)$$

$$0.2 \leq R_{ms}(1 \text{ to } 10 \ \mu m) \leq 0.4 \ [\mu m] \quad (2)$$

$$0.4 \leq R_{ms}(10 \text{ to } 100 \ \mu m) \leq 1.0 \ [\mu m] \quad (3)$$

wherein the $R_{ms}$ represents a square average surface roughness obtained by measuring the surface form of the support by an atomic force microscopy (AFL), the $R_{ms}$(10 to 10 $\mu m$) shows the value about the frequency space of from 1 to 10 $\mu m$, and the $R_{ms}$(10 to 100 $\mu m$) shows the value about the frequency space of from 1 to 100 $\mu m$.

DETAILED DESCRIPTION OF THE INVENTION

The present invention is described in detail below.

The $R_{ms}$ is practically defined as follows.

The $R_{ms}$ is the square root of the value obtained by averaging the squares of the deviations from the standard plane to the specified plane [the practically measured range; the range of the X-axis direction ($X_R$-$X_L$), the range of the Y-axis direction ($Y_T$-$Y_B$)] when a sample is measured by the AFL, and is given by the following equation.

$$Rms = \left( \frac{1}{S_o} \int_{Y_B}^{Y_T} \int_{X_L}^{X_R} \{F(X,Y) - Z_o\}^2 \, dX \, dY \right)^{1/2}$$

In the above equation, F(X,Y) is the function of the wave form data of the specified plane, $Z_O$ is the average value of the heights of the specified plane, and $S_O$ is the area of the specified plane.

Also, $R_{ms}$(a to b $\mu m$) is the square average surface roughness (unit: $\mu m$) of the three-dimensional image data obtained by applying the two-dimensional FFT (high-speed Fourier transformation) treatment of $$U(W_x, W_y) = \iint U(x,y) e^{-iWx} e^{-iWy} dx dy$$

(wherein U(x,y)=real space data $U(W_x, W_y)$=frequency space data)

to the three-dimensional image data measured by the AFL to covert the three-dimensional image data to the data in a frequency space, taking out the space frequency data from a wavelength a $\mu m$ to a wavelength b $\mu m$, and inversely applying the two-dimensional FFT treatment to the space frequency data. Accordingly, the above-described $R_{ms}$(10 to 100 $\mu m$) corresponds to the average depth of the pits existing in the range of the open diameters of from 10 to 100 $\mu m$ and the $R_{ms}$(1 to 10 $\mu m$) corresponds to the average depth of the pits existing in the range of the open diameters of from 1 to 10 $\mu m$.

The present invention is based on the finding that a support having the surface form simultaneously satisfying the range of each of the $R_{ms}$(10 to 100 $\mu m$) and the $R_{ms}$(1 to 10 μm) and the range of the ratio of them is particularly suitable as the support for a lithographic printing plate.

That is, when both the $R_{ms}$(10 to 100 μm) and the $R_{ms}$(1 to 10 μm) are lower than the lower limit values respectively, the pits are shallow and the water-holding amount becomes less and when they are higher than the upper limit values respectively, the coexistence of extremely deep pits is allowed, whereby an ink enters the bottom portions of the deep pits and also support is liable to be caught by a wall surface. Both cases undesirably cause inferior printing, in particular staining.

Also, when the support has such undesirable values of the $R_{ms}$(10 to 100 μm) and the $R_{ms}$(1 to 10 μm) and further the $R_{ms}$(10 to 100 μm)/$R_{ms}$(1 to 10 μm) ratio is less than 1.5, the $R_{ms}$(10 to 10 μm) pits having large open diameters become relatively less, whereby the water-holding property is insufficient. On the other hand, when the ratio exceeds 3.0, the pits having large open diameters become too much, whereby an ink is liable to enter the pits and also the support is liable to be caught by a wall surface.

Each value of the $R_{ms}$(10 to 100 μm), the $R_{ms}$(1 to 10 μm) and also the $R_{ms}$(10 to 100 μm)/$R_{ms}$(1 to 10 μm) by the AFL in the present invention described above can be realized by applying at least 2 steps of a mechanical graining treatment, an electrochemical graining treatment, and a chemical etching treatment to a support in a series of graining treatment steps described hereinbelow and properly selecting the conditions in each treatment.

The measurement by the AFL may be performed in any step after applying at least 2 steps of the mechanical graining treatment, the electrochemical graining treatment, and the chemical etching treatment.

The construction and the measurement principle of the AFL can refer to C. Binning, C. F. Quate and Ch. Gerber; *Physical Review, Letter*, 56, 930(1986).

The lithographic printing plate of the present invention is described in detail by referring to a following preferred embodiment of the production process of the lithographic printing plate below.

An aluminum plate used as the support in the present invention includes a pure aluminum plate and an aluminum alloy plate. As the aluminum alloy, various alloys can be used. For example, alloys of aluminum and other metal(s) such as silicon, copper, manganese, magnesium, chromium, zinc, lead, nickel, bismuth, etc., are used.

As the aluminum alloys for the support of an offset printing plate, for example, JP-B-58-6635 (the term "JP-B" as used herein means an "examined published Japanese patent application") limits to Fe and Si components as the alloy components of the aluminum alloy and specifies an intermetallic compound. Also, in JP-B-55-28874, cold rolling and intermediate annealing are applied to an aluminum alloy and a voltage application method in electrolytic graining is limited. The aluminum alloys used for the printing plates include not only the aluminum alloys described in JP-B-62-41304, JP-B-1-46577, JP-B-1-46578, JP-B-1-47545, JP-B-1-35910, JP-B-63-60823, JP-B-63-60824, JP-B-4-13417, JP-B-4-19290, JP-B-4-19291, JP-B-4-19293, JP-B-62-50540, JP-B-61-272357, JP-A-62-74060, JP-A-61-201747, JP-A-63-143234, JP-A-63-143235, JP-A-63-255338, JP-A-1-283350, EP-272,528, U.S. Pat. Nos. 4,902,353 and 4,818,300, EP 394,816, U.S. Pat. No. 5,019, 188, West German Patent 3,232,810, U.S. Pat. No. 4,435, 230, EP 239,995, U.S. Pat. No. 4,822,715, West German Patent 3,507,402, U.S. Pat. No. 4,715,903, West German Patent 3,507,402, EP 289,844, U.S. Pat. Nos. 5,009,722 and 4,945,004, West German Patent 3,714,059, U.S. Pat. Nos. 4,686,083 and 4,861,396, EP 158,941, etc., but also other general aluminum alloys.

As the production method for the support for the lithographic printing plate, a method of using hot rolling and also a method of carrying out by continuous casting are proposed. For example, East German Patent 252,799 describes a plate material formed by a twin roll method. Also, EP 223,737, U.S. Pat. Nos. 4,802,935 and 4,800,950 describe aluminum alloys in the forms of limiting fine amounts of alloy components. Furthermore, E.P. 415,238 proposes a method of producing an aluminum support by continuous casting and continuous casting+heat rolling.

In the present invention, various surface treatments, transfer of unevenness from an member having an uneven surface, etc., are applied to such an aluminum plate to provide a printing master plate having a uniform unevenness, and by forming a photosensitive layer comprising a diazo compound, etc., on the master plate, to provide an excellent photosensitive lithographic printing plate. In any cases, it is necessary to select an appropriate material as the aluminum plate for obtaining the excellent lithographic printing plate.

Before the mechanical graining treatment, if necessary, a pre-treatment may be applied to the aluminum plate. The pre-treatment is typically a removal of a rolling oil from the surface of the aluminum plate by using a solvent such as trichlene, etc., or a surface active agent or an exposure of a clean surface of the aluminum plate by using an alkali etching agent such as sodium hydroxide, potassium hydroxide, etc.

Practically, as the solvent degreasing method, there are a method of using a petroleum series solvent such as gasoline, kerosine, benzine, solvent naphtha, normal hexane, etc., and a method of using a chlorine series solvent such as trichloroethylene, methylene chloride, perchloroethylene, 1,1,1-trichloroethane, etc.

As the alkali degreasing method, there are a method of using an aqueous solution of a sodium salt such as sodium hydroxide, sodium carbonate, sodium hydrogencarbonate, sodium sulfate, etc.; a method of using an aqueous solution of a silicate such as sodium orthosilicate, sodium metasilicate, sodium No. 2 silicate, sodium No. 3 silicate, etc.; a method of using an aqueous solution of a phosphate such as sodium primary phosphate, sodium tertiary phosphate, sodium secondary phosphate, sodium tripolyphosphate, sodium pyrophosphate, etc.

Because in the case of using the alkali decreasing method, there is a possibility dissolving the surface of the aluminum plate according to the treatment time and the treatment temperature, it is necessary to carry out the alkali degreasing treatment without accompanied by the dissolution phenomenon.

For the degreasing treatment with a surface active agent, an aqueous solution of an anionic surface active agent, a cationic surface active agent, a nonionic surface active agent, or an amphoteric surface active agent is used and in this case, various commercially available materials can be used.

As the degreasing method, an immersion method, a spraying method, a method of rubbing with a cloth impregnated with a liquid, etc., can be used. Also, for the immersion method or the spraying method, a ultrasonic wave may be used.

About the above-described degreasing treatment, the description of JP-A-2-26793 can be referred to.

A mechanical graining treatment is then carried out.

As the mechanical graining treatment method, there are a transferring method, a brushing method, a liquid horning method, etc., and these method may be carried out together by considering the productivity, etc.

As the transferring method for press-contacting an uneven surface onto the surface of the aluminum plate, various methods can be used. That is, in addition to the methods described in JP-A-55-74898, JP-A-60-36195, and JP-A-60-203496 described above, a method of carrying out the transferring method several times described in Japanese Patent Application No. 4-175945 and a method of using a material that the surface thereof has an elasticity described in Japanese Patent Application No. 4-204235 can be applied.

Also, an uneven pattern may be repeatedly transferred onto the surface of the aluminum plate using a roll etched with a fine unevenness by discharge working, a shot blast, a laser, plasma etching, etc., or a surface of a plate having an unevenness formed by coating fine particles is brought into contact with the surface of the aluminum plate and a pressure is repeatedly applied onto the assembly, thereby the uneven pattern corresponding to the average diameter of the fine particles may be repeatedly transferred onto the surface of the aluminum plate.

Various methods of giving a fine unevenness onto a transfer roll are disclosed in JP-A-3-8635, JP-A-3-66404, JP-A-63-65017, etc. Also, fine grooves are formed on the surface of a transfer roll in two directions using a die, a cutting tool, a laser, etc., to form a square unevenness on the surface of the roll. In this case, a treatment of making round the square unevenness on the surface of the transfer roll thus formed may be performed by applying a known etching treatment onto the surface of the roll. Also, as a matter of course, quenching, hard chromium plating, etc., may be applied to the transfer roll to increase the hardness of the surface thereof.

In the case of using a brush for applying mechanical graining, it is preferred to use brush bristles having a bending elastic modulus of from 10,000 to 40,000 kg/cm$^2$, and preferably from 15,000 to 35,000 kg/cm$^2$ and a bristle nerve of 500 g or lower, and preferably 400 g or lower. In this case, it is more preferred to use abrasive having particle sizes of from 20 to 80 μm, and preferably from 30 to 60 μm.

There is no particular restriction on the quality of the brush if the brush has the above-described mechanical strength and the material for the brush can be properly selected from, for example, synthetic resins and metals. The synthetic resins include polyamides such as nylon, etc.; polyolefins such as polypropylene, etc,; polyesters such as polyvinyl chloride, polybutylene terephthalate, etc.; and polycarbonate. Also, metals include stainless steel, brass, etc.

Also, there is no particular restriction on the abrasive if the particle sizes of the abrasive are in the particle size range described above. Material of the abrasive is selected from alumina, silica, silicon carbide, silicon nitride, etc., which are conventionally used for a mechanical graining treatment.

The mechanical graining treatment is carried out by press-contacting a roll brush having the above-described brush bristles to the surface of the aluminum plate while rotating the roll brush at a high speed and also while supplying the above-described abrasive to the roll brush. In this case, there are no particular restrictions on the rotation number and the press-contacting force of the roll brush and the supplying amount of the abrasive.

As an apparatus suitable for mechanical graining described above, there is, for example, the apparatus described in JP-B-50-40047.

After carrying out the mechanical graining treatment as described above, the surface of the aluminum plate is subjected to a chemical etching treatment using an aqueous alkali solution having a pH of 11 or higher, and preferably 13 or higher, for smoothing and symmetrizing the aluminum plate. The etching amount of from 5 g/m$^2$ to 25 g/m$^2$, and preferably from 6 g/m$^2$ to 15 g/m$^2$. When the etching amount is less than 5 g/m$^2$, the unevenness formed by the mechanical graining treatment cannot be smoothed and also uniform pits cannot be formed in the electrolytic treatment of the post step. On the other hand, when the etching amount exceeds 25 g/m$^2$, the above-described unevenness formed is vanished.

As the alkali solution which can be used for the chemical etching treatment, an aqueous solution of a sodium salt such as sodium hydroxide, sodium carbonate, sodium hydrogencarbonate, sodium sulfate, etc,; an aqueous solution of a silicate such as sodium orthosilicate, sodium metasilicate, sodium No. 2 silicate, sodium No. 3 silicate, etc.; an aqueous solution of a phosphate such as sodium primary phosphate, sodium secondary phosphate, sodium tertiary phosphate, sodium tripolyphosphate, sodium pyrophosphate, sodium hexametaphosphate, etc., can be used.

As the chemical etching treatment conditions, the concentration of the aqueous alkali solution is from 0.01% by weight to 50% by weight, the liquid temperature is from 20° C. to 90° C., and the treatment time is from 5 seconds to 5 minutes. These conditions are properly selected so that the etching amount becomes the amount described above.

When the surface of the aluminum plate is subjected to the chemical etching treatment with the above-described aqueous alkali solution, undissolved residues, that is, smut forms on the surface thereof. Thus, the smut is removed using an aqueous acidic solution having the same composition as the aqueous acidic solution used for the electrolytic graining treatment described below.

In the preferred conditions for the desmutting treatment, the liquid temperature is from 30 to 80° C. and the treatment time is from 3 seconds to 3 minutes.

Then, the aluminum plate thus treated is subjected to an electrolytic graining treatment. In the electrolytic graining treatment in the present invention, it is preferred to carry out the 1st and 2nd electrolytic treatments by an alternating wave electric current in an aqueous acidic solution before and after an cathode electrolytic treatment. By the cathode electrolytic treatment, smut is formed on the surface of the aluminum plate and also hydrogen gas is generated, whereby uniform electrolytic graining becomes possible.

First, the 1st and 2nd electrolytic graining treatments by an alternating wave electric current in an aqueous acidic solution are explained. In addition, in the electrolytic graining treatments, the conditions for the 1st treatment may be the same as the conditions for the 2nd treatment or the condition of each treatment may be different in the preferred ranges of the treatment conditions.

The electrolytic graining treatment can be carried out according to the electrochemical graining methods described, for example, in JP-B-48-28123 and British Patent 896,563. In the electrolytic graining treatment, an alternating electric current of a sine wave is used but an alternating current having the specific wave form as described in JP-A-52-58602 can be used.

Also, the methods described in JP-A-55-158198, JP-A-56-28898, JP-A-52-58602, JP-A-52-152302, JP-A-54-85802, JP-A-60-190392, JP-A-58-120531, JP-A-63-176187, JP-A-1-5889, JP-A-1-280590, JP-A-1-118489, JP-A-1-148592, JP-A-1-178496, JP-A-1-188315, JP-A-1-154797, JP-A-2-235794, JP-A-3-260100, JP-A-3-253600, JP-A-4-72079, JP-A-4-72098, JP-A-3-267400, and JP-A-1-141094 can be applied.

Also, as the frequency, in addition to the methods described above, the methods proposed for electrolytic condensers as described, for example, in U.S. Pat. Nos. 4,276,129 and 4,676,879 can be also used for the electrolytic graining treatment.

As the aqueous acidic solution which is an electrolyte, the electrolytes described in U.S. Pat. Nos. 4,671,859, 4,665,576, 4,661,219, 4,618,405, 4,626,328, 4,600,428, 4,566,960, 4,566,958, 4,566,959, 4,416,972, 4,374,710, 4,374,710, 4,336,113, 4,184,932, etc., can be used.

The concentration of the acidic solution is preferably from 0.5 to 2.5% by weight and from the point of removing smut described above, the concentration is more preferably from 0.7 to 2.0% by weight. Also, the liquid temperature is preferably from 20 to 80° C., and more preferably from 30 to 60° C.

Various electrolytic cells and electric power sources, which can be used in the present invention, are described in U.S. Pat. No. 4,203,637, JP-A-56-123400, JP-A-57-59770, JP-A-53-12738, JP-A-53-32821, JP-A-53-32822, JP-A-53-32823, JP-A-55-122896, JP-A-55-132884, JP-A-62-127500, JP-A-1-52100, JP-A-1-52098, JP-A-60-67700, JP-A-1-230800, JP-A-3-257199, etc.

In addition to the electrolytic cells and the electric power sources described above, various ones, which can be applied in the present invention, are proposed as described in JP-A-52-58602, JP-A-52-152302, JP-A-53-12738, JP-A-53-12739, JP-A-53-32821, JP-A-53-32822, JP-A-53-32833, JP-A-53-32824, JP-A-53-32825, JP-A-54-85802, JP-A-55-122896, JP-A-55-132884, JP-B-48-28123, JP-B-51-7081, JP-A-52-133838, JP-A-52-133840, JP-A-52-133844, JP-A-52-133845, JP-A-53-149135, and JP-A-54-146234.

The electrolytic treatment is carried out at an anode quantity of electricity of from 50 to 400 $C/dm^2$, and preferably from 70 to 200 $C/dm^2$. When the anode quantity of electricity is less than 50 $C/dm^2$, fine pits are not uniformly formed, while when the anode quantity of electricity is more than 400 $C/dm^2$, pits become too large.

Between the 1st and 2nd electrolytic graining treatments, a cathode electrolytic treatment is applied to the aluminum plate. By the cathode electrolytic treatment, smut is formed on the surface of the aluminum plate and also hydrogen gas is generated, thereby more uniform electrolytic graining becomes possible.

The cathode electrolytic treatment is carried out in an aqueous acidic solution at a cathode quantity of electricity of from 3 to 80 $C/dm^2$, and preferably from 5 to 30 $C/dm^2$. When the cathode quantity of electricity is less than 3 $C/dm^2$, the attached amount of the smut is insufficient, while when the cathode quantity of electricity exceeds 80 $C/dm^2$, the attached amount of the smut becomes too much, and both cases are undesirable.

Also, the electrolyte used in the cathode electrolytic treatment may be the same as or different from the solution used for the 1st and 2nd electrolytic graining treatments.

After the 2nd electrolytic graining treatment, the aluminum plate is subjected to a 2nd chemical etching treatment using an aqueous alkali solution of a pH of 11 or higher. The aqueous alkali solution having a pH of 11 or higher used in the 2nd chemical etching treatment may be the same as the aqueous alkali solution used in the above-described 1st chemical etching treatment or may be different from the latter alkali solution.

However, the etching amount in the 2nd etching treatment differs from that in the 1st chemical etching treatment and is from 0.1 to 8 $g/m^2$, and preferably from 0.2 to 3.0 $g/m^2$. When the etching amount is less than 0.1 $g/m^2$, the edge portions of the pits obtained by the electrolytic graining treatments cannot be smoothed, while when the etching amount is more than 8 $g/m^2$, pits formed are vanished.

Because smut forms on the surface of the aluminum plate by the above-described chemical etching treatment, the smut formed is removed from the aluminum plate using an aqueous solution containing sulfuric acid as the main component. In this case, the aqueous solution containing sulfuric acid as the main component includes an aqueous solution of sulfuric acid alone and an aqueous solution of a proper mixture of sulfuric acid and phosphoric acid, nitric acid, chromic acid, hydrochloric acid, etc. The removal of smut using the aqueous solution containing sulfuric acid as the main component is described, for example, in JP-A-53-12739.

Also, a combination of alkali treatments may be used for the removal of the smut as described, for example, in JP-A-56-51388.

Furthermore, the methods described in JP-A-60-8091, JP-A-63-176188, JP-A-1-38291, JP-A-1-127389, JP-A-1-188699, JP-A-3-177600, JP-A-3-126891, and JP-A-3-191100 can be used together with the above-described method for the removal of the smut.

Then, an anodic oxidation film is formed on the surface of the aluminum plate thus treated. For example, an anodic oxidation film can be formed on the aluminum plate by passing an electric current in an aqueous solution having a sulfuric acid concentration of from 50 to 300 g/liter and an aluminum concentration of 5% by weight or lower using the aluminum plate as the anode. The aqueous solution described above may further contain phosphoric acid, chromic acid, oxalic acid, sulfonic acid, benzenesulfonic acid, etc.

The amount of the oxide film formed is preferably from 1.0 to 5.0 $g/m^2$, and more preferably from 1.5 to 4.0 $g/m^2$.

The treatment conditions for the anodic oxidation variously differ according to the electrolyte used and thus cannot be generally defined but are in the ranges that the concentration of the electrolyte is from 1 to 80% by weight, the liquid temperature is from 5 to 70° C., the current density is from 0.5 to 60 $A/cm^2$, the voltage is from 1 to 100 volts, and the electrolysis time is from 15 seconds to 50 minutes, and the treatment conditions are controlled in the above-described ranges such that the amount of the oxide film formed becomes the above-described coverage.

The electrolytic apparatus used for the anodic oxidation is described in JP-A-48-26638, JP-A-47-18739, JP-B-58-24517, etc. Also, the methods described in JP-A-54-81133, JP-A-57-47894, JP-A-57-51289, JP-A-57-51290, JP-A-57-54300, JP-A-57-136596, JP-A-58-107498, JP-A-60-200256, JP-A-62-136596, JP-A-63-176494, JP-A-4-176897, JP-A-4-280997, JP-A-6-207299, JP-A-5-24377, JP-A-5-32083, JP-A-5-125597, JP-A-5-195291, etc., can be used for the anodic oxidation.

A sealing apparatus of a support giving a photosensitive printing plate having a good stability with the passage of time, a good developability, and giving no stain at the non-image portions by applying a sealing treatment to the support with steam and hot water after etching the anodic oxidized film to give the optimum adhesion between the support and a photosensitive composition after forming the anodic oxidized film as described above is proposed as described in JP-B-56-12518. The sealing treatment after the formation of the anodically oxidized film may be carried out by such an apparatus in the present invention.

Also, the sealing treatment may be carried out by the apparatus or the methods described in JP-A-4-4194, Japanese Patent Application Nos. 4-33952, 4-33951, and 3-315245.

Furthermore, the potassium fluorozirconate treatment described in U.S. Pat. No. 2,946,638, the phosphomolybdate treatment described in U.S. Pat. No. 3,201,247, the alkyl titanate treatment described in British Patent 1,108,559, the polyacrylic acid treatment described in German Patent 1,091,433, the polyvinylsulfinic acid treatment described in German Patent 1,134,093 and British Patent 1,230,447, the phosphonic acid treatment described in JP-B-44-6409, the phytic acid treatment described in U.S. Pat. No. 3,307,951, the treatment with the oleophilic organic high molecular weight compound and the divalent metal described in JP-A-58-16893 and JP-A-58-18291; the formation of the underlayer of a hydrophilic cellulose (for example, carboxymethyl cellulose) containing a water-soluble metal salt (for example, zinc acetate) described in U.S. Pat. No. 3,860,426, the hydrophilic treatment by subbing of the water-soluble polymer having a sulfonic acid group described in JP-A-59-101651; subbing with the phosphate described in JP-A-62-19494, with the water-soluble epoxy compound described in JP-A-62-33692, with the phosphoric acid-denatured starch described in JP-A-62-97892, with the diamine compound described in JP-A-63-56498, with the organic acid salt or the inorganic acid salt of amino acid described in JP-A-63-130391, with the organic sulfonic acid containing a carboxyl group or a hydroxy group described in JP-A-63-145092, with the compound having an amino group and a phosphonic acid group described in JP-A-63-165183, with the specific carboxylic acid derivative described in JP-A-2-316290, with the phosphoric acid ester described in JP-A-3-215095, with the compound having one amino group and one oxygen acid group described in JP-A-3-261592, with the malic acid ester described in JP-A-3-215095, with the aliphatic or aromatic phosphonic acid such as phenyl-phosphonic acid described in JP-A-5-246171, the compound containing a sulfur atom, such as thiosalicyclic acid, described in JP-A-1-307745, with the compound having the oxygen acid group of phosphorus described in JP-A-4-282637, etc.; and coloring with the acid dye described in JP-A-60-64352 can be applied to the aluminum support thus treated in the present invention.

In the present invention, the measurement by the AFL is carried out after applying at least 2 steps of the mechanical graining treatment, the electrochemical graining treatment, and the chemical etching treatment. That is, the measurement by the AFL may be carried out after finishing a series of the graining treatments or can be carried out at any time after applying the above-described 2 steps. The measurement by the AFL is preferably carried out after the formation of the anodic oxidation film. In addition, when a treatment is interrupted but when the subsequent treatment is the same treatment as the treatment before the interruption, both the treatments are regarded as one step.

The measurement by the AFL can be carried out using, for example, SP13700 (trade name, manufactured by Seiko Instruments Inc.)

The steps of the measurement procedure by the AFL are as follows.

First, an aluminum plate sample cut into a size of 1 cm square is set on a horizontal sample stand placed on a piezoscanner, a cantilever is approached the surface of the sample, when the cantilever reaches the region of acting an atomic force, the sample surface is scanned in the X-Y direction, and in this case, the unevenness of the sample is caught as the displacement of the piezoscanner in the Z direction. The piezoscanner capable of scanning X-Y 150 $\mu$m and Z 10 $\mu$m is used. As the cantilever, SI-DF20 (trade name, manufactured by NANOPROBE Co.) having a resonance frequency of from 120 to 150 kHz and a spring constant of from 12 to 20 N/m is used. The measurement is applied to 120 $\mu$m square by 4 views, that is, in the range of 240 $\mu$m square, the resolving powers in this case are 1.9 $\mu$m in the X-Y direction and 1 nm in the Z direction, and the measurement is carried out as a DFM mode (Dynamic Force Mode) at a scanning speed of 60 $\mu$m/second.

Also, by frequency analyzing the three-dimensional data obtained, the $R_{ms}$(10 to 100 $\mu$m) and the $R_{ms}$(1 to 10 $\mu$m) can be obtained.

After confirming that the measured values of the $R_{ms}$(10 to 100 $\mu$m) and the $R_{ms}$(1 to 10 $\mu$m) by the AFL satisfy the relations (1), (2), and (3) described above, a photosensitive layer illustrated below is formed on the aluminum plate to provide a photosensitive lithographic printing plate.

[I] The Case of Forming a Photosensitive Layer Containing an o-naphthoquinonediazidosulfonic Acid Ester and a Novolac Resin of a Phenol-cresol Mixture o-Quinonediazide compounds are o-naphthoquinonediazide compounds and they are described, for example, in U.S. Pat. Nos. 2,766,118, 2,767,092, 2,772,972, 2,859,112, 3,102,809, 3,106,465, 3,635,709, and 3,647,443 and other many publications. Those compounds can be suitably used in the present invention. In these compounds, aromatic hydroxy compounds such as an o-naphthoquinonesulfonic acid ester and an o-naphthoquinonediazidocarboxylic acid ester and aromatic amino compounds such as o-naphthoquinonediazidosulfonic acid amide and o-naphthoquinonediazidocarboxylic acid amide are preferable. In particular, the product obtained by the ester reaction of the condensate of pyrogallol and acetone and o-naphthoquinonediazidosulfonic acid ester described in U.S. Pat. No. 3,635,709, the product obtained by the ester reaction of a polyester having a hydroxy group at the terminal and o-naphthoquinonediazidosulfonic acid or o-naphthoquinonediazidocarboxylic acid described in U.S. Pat. No. 4,028,111, the product obtained by the ester reaction of the homopolymer of p-hydroxystyrene or a copolymer of p-hydroxystyrene and other monomer copolymerizable with it and o-naphthoquinonediazidosulfonic acid or o-naphthoquinonediazidocarboxylic acid described in British Patent 1,494,043, and the product obtained by the amide reaction of a copolymer of p-amino-styrene and other monomer copolymerizable with p-aminostyrene and o-naphthoquinonediazidosulfonic acid or o-naphthoquinonediazidocarboxylic acid as described in U.S. Pat. No. 3,759,711 are very excellent.

These o-qunonediazide compounds can be used singly but it is preferred to use as a mixture thereof with an alkali-soluble resin.

The suitable alkali-soluble resin includes novolac type phenol resins, which include, practically, a phenol-formaldehyde resin, an o-cresol-formaldehyde resin, a m-cresol-formaldehyde resin. Furthermore, it is more preferred to use the phenol resin as described above together with a condensate of phenol or cresol substituted with an alkyl group having from 3 to 8 carbon atoms and formaldehyde, such as a t-butylphenol-formaldehyde resin described in U.S. Pat. No. 4,028,111.

Also, to form visible images by light exposure, a compound such as o-naphthoquinonediazido-4-sulfonyl chloride, an inorganic anion salt of p-diazophenylamine, a trihalomethyloxadiazole compound, a trihalomethyloxadiazole compound having a benzofuran ring, etc., is added to the o-quinonediazide compound.

On the other hand, as a coloring agent, triphenylmethane dyes such as Victoria Blue BOH, Crystal Violet, Oil Blue, etc., are used, Also, the dyes described in JP-A-62-293247 are particularly preferred.

Furthermore, as an ink-receptivity improving agent, the novolac resin obtained by condensing a phenol substituted by an alkyl group having from 3 to 15 carbon atoms, such as t-butylphenol, N-oxtylphenol, or t-butylphenol and formaldehyde as described in JP-B-57-23253 or the o-naphthoquinonediazido-4-sulfonic acid ester or o-naphthoquinonediazido-5-sulfonic acid ester of the novolac resin as described in JP-A-61-242446 can be incorporated in the o-quinonediazide compound.

Also, to improve the developability, the nonionic surface active agents described in JP-A-62-251740 can be contained in the composition described above.

The above-described composition is coated on a support as a solution thereof in a solvent capable of dissolving the components described above.

The solvent used in this case includes ethylene chloride, cyclohexanone, methyl ethyl ketone, ethylene glycol monomethyl ether, ethylene glycol monoethyl ether, 2-methoxyethyl acetate, 1-methoxy-2-propanol, 1-methoxy-2-propyl acetate, methyl lactate, ethyl lactate, dimethyl sulfoxide, dimethylacetamide, dimethylformamide, water, N-methyl-pyrrolidone, tetrahydrofurfuryl alcohol, acetone, diacetone alcohol, methanol, ethanol, isopropanol, diethylene glycol dimethyl ether, etc. These solvents may be used alone or as a mixture thereof.

The photosensitive composition comprising these components is formed at a coverage of from 0.5 to 3.0 g/m$^2$ as solid components.

[II] The Case of Forming a Photosensitive Layer Containing a Diazo Resin and a Water-insoluble and Oleophilic High Molecular Weight Compound The diazo resin includes, for example, a diazo resin inorganic salt which is the organic solvent-soluble reaction product of a condensate of p-diazodiphenylamine and formaldehyde or acetaldehyde and a hexafluorophosphate or a tetrafluoroborate and an organic solvent-soluble diazo resin organic acid salt which is the-reaction product of the above-described condensate and a sulfonic acid such as p-toluenesulfonic acid or a salt thereof, a phosphinic acid such as benzenephosphinic acid or a salt thereof, or a hydroxy group-containing compound such as 2,4-dihydroxybenzophenone, 2-hydroxy-4-methoxybenzophenone-5-sulfonic acid or a salt thereof as described in U.S. Pat. No. 3,300,309.

Also, other diazo resin which can be suitably used in the present invention is a co-condensate containing an aromatic compound having at least one organic group selected from a carboxyl group, a sulfonic acid group, a sulfinic acid group, an oxygen acid group of phosphorus, and a hydroxy group and a diazonium compound, preferably an aromatic diazonium compound as the structural units.

Also, the above-described aromatic ring preferably includes a phenyl group and a naphthyl group.

As the above-described aromatic compound containing at least one of a carboxyl group, a sulfonic acid group, a sulfinic acid group, an oxygen acid group of phosphorus, and a hydroxy group, there are various compounds and the preferred aromatic compounds are 4-methoxybenzoic acid, 3-chlorobenzoic acid, 2,4-dimethoxybenzoic acid, p-phenoxybenzoic acid, 4-anilinobenzoic acid, phenoxyacetic acid, phenylacetic acid, p-hydroxybenzoic acid, 2,4-dihydroxy acid, benzenesulfonic acid, p-toluenesulfonic acid, 1-naphthalenesulfonic acid, phenylphosphoric acid, and phenylphosphonic acid. As the aromatic diazonium compound which is the constitutional unit for the above-described co-condensate, the diazonium salts described in JP-B-49-48001 can be used and, in particular, diphenylamine-4-diazonium salts are preferred.

The diphenylamine-4-diazonium slats are induced from 4-amino-diphenylamines and such 4-amino-diphenylamines include 4-aminodiphenylamine, 4-amino-3-methoxydiphenylamine, 4-amino-2-methoxydiphenylamine, 4'-amino-2-methoxydiphenylamine, 4'-amino-4-methoxydiphenylamine, 4-amino-3-methyldiphenylamine, 4-amino-3-ethoxyphenylamine, 4-amino-3-β-hydroxyethoxydiphenylamine, 4-amino-diphenylamine-2-sulfonic acid, 4-amino-diphenylamine-2-carboxylic acid, 4-amino-diphenylamine-2'-carboxylic acid, etc., and 3-methoxy-4-amino-4-diphenylamine and 4-aminodiphenylamine are particularly preferred.

Also, other diazo resins than the co-condensated diazo resin with the aromatic compound having an acid group, the diazo resins condensated with the aldehyde containing an acid group or the acetal compound thereof described in JP-A-4-18559, JP-A-3-163551, and JP-A-3-253857 can be preferably used.

The counter anion of the diazo resin includes anions which form stable salts with the diazo resin and make the resin soluble in an organic solvent. These anions include organic carboxylic acids such as decanic acid, benzoic acid, etc., organic phosphoric acids such as phenylphosphoric acid, etc., and sulfonic acid.

Practical examples thereof include aliphatic and aromatic sulfonic acids such as methanesulfonic acid, fluoroalkanesulfonic acids (e.g., trifluoromethanesulfonic acid), laurylsulfonic acid, dioctylsulfonic acid, dioctylsuccinic acid, dicyclohexylsulfosuccinic acid, camphorsulfonic acid, tolyloxy-3-propanesulfonic acid, nonylphenoxy-3-propanesulfonic acid, nonylphenoxy-4-butanesulfonic acid, dibutylphenoxy-3-propanesulfonic acid, diamylphenoxy-3-propanesulfonic acid, dinonylphenoxy-3-propanesulfonic acid, dibutylphenoxy-4-butanesulfonic acid, dinonylphenoxy-4-butanesulfonic acid, benzenesulfonic acid, toluenesulfonic acid, mesitylenesulfonic acid, p-chlorobenzenesulfonic acid, 2,5-dichlorobenzenesulfonic acid, sulfosalicylic acid, 2,5-dimethylbenzenesulfonic acid, p-acetylbenzenesulfonic acid, 5-nitro-o-toluenesulfonic acid, 2-nitrobenzenesulfonic acid, 3-chlorobenzenesulfonic acid, 3-bromobenzenesulfonic acid, 2-chloro-5-nitrobenzenesulfonic acid, butylbenzenesulfonic acid, octylbenzenesulfonic acid, dodecylbenzenesulfonic acid, dodecylbenzenesulfonic acid, octylbenzenesulfonic acid, decylbenzenesulfonic acid, dodecylbenzenesulfonic acid, butoxybenzenesulfonic acid, dodecyloxybenzenesulfonic acid, 2-hydroxy-4-methoxybenzophenone-5-sulfonic acid, isopropylnaphthalenesulfonic acid, butylnaphthalenesulfonic acid, hexylnaphthalenesulfonic acid, octylnaphthalenesulfonic acid, butoxynaphthalenesulfonic acid, dodecyloxynaphthalenesulfonic acid, dibutylnaphthalenesulfonic acid, dioctylnaphthalenesulfonic acid, triisopropylnaphthalenesulfonic acid, tripropylnaphthalenesulfonic acid, 1-naphthol-5-sulfonic acid, naphthalene-1-sulfonic acid, naphthalene-2-sulfonic acid, 1,8-dinitro-naphthalene-3,6-disulfonic acid, dimethyl-5-isophthalate, etc.; hydroxy group-containing aromatic compounds such 2,2',4,4'-tetrahydroxybenzophenone, 1,2,3-trihydroxybenzophenone, 2,2',4-trihydroxybenzophenone, etc.; halogenated Lewis acids such as hexafluorophosphoric acid, tetrafluoroboric acid, etc.; and perhalogenic acids such as $HClO_4$, $HIO_4$, etc., although the anions are not limited to these compounds.

In these compounds described above, butylnaphthalenesulfonic acid, dibutylnaphthalenesulfonic acid, hexafluorophosphoric acid, 2-hydroxy-4-methoxybenzophenone-5-sulfonic acid, hexafluorophosphoric acid, 2-hydroxy-4-methoxybenzophenone-5-sulfonic acid, and dedecylbenzenesulfonic acid are particularly preferred.

The molecular weight of the diazo resin used in the present invention can be desirably changed by changing the molar ratio of the monomers and the condensation condition but to use the diazo resin effectively for the object of the present invention, the molecular weight of the diazo resin is from about 400 to 100,000, and preferably from about 800 to 8,000.

As the water-insoluble and oleophilic high molecular weight compounds, there are copolymers containing the monomer(s) shown by (1) to (15) described below and usually having a molecular weight of from 1 to 200,000.

(1) Acrylamides, methafrylamides, acrylic acid esters, methacrylic acid esters, and hydroxystyrenes each having an aromatic hydroxy group, such as N-(4-hydroxyphenyl) acrylamide, N-(4-hydroxyphenyl)methacrylamide, o-, m-, or p-hydroxy-styrenes, and o-, m-, and p-hydroxyphenyl acrylates or hydroxyphenyl methacrylates.

(2) Acrylic acid esters each having an aliphatic hydroxy group, such as 2-hydroxyethyl acrylate, 2-hydroxyethyl methacrylate, or 4-hydroxybutyl methacrylate.

(3) Unsaturated carboxylic acids such as acrylic acid, methacrylic acid, maleic anhydride, or itaconic acid.

(4) (Substituted) alkyl acrylate such as methyl acrylate, ethyl acrylate, propyl acrylate, butyl acrylate, amyl acrylate, hexyl acrylate, cyclohexyl acrylate, octyl acrylate, benzyl acrylate, 2-chloroethyl acrylate, glycidyl acrylate, N-dimethylaminoethyl acrylate, etc.

(5) (Substituted) alkyl methacrylate such as methyl methacrylate, ethyl methacrylate, propyl methacrylate, butyl methacrylate, amyl methacrylate, cyclohexyl methacrylate, benzyl methacrylate, glycidyl methacrylate, N-dimethylaminoethyl methacrylate, etc.

(6) Acrylamides and methacrylamides, such as acrylamide, methacrylamide, N-methylol acrylamide, N-methylol methacrylamide, N-ethyl acrylamide, N-hexyl methacrylamide, N-cyclohexyl acrylamide, N-hydroxyethyl acrylamide, N-phenyl acrylamide, N-nitrophenyl acrylamide, N-ethyl-N-phenyl acrylamide, etc.

(7) Vinyl ethers such as ethyl vinyl ether, 2-chloroethyl vinyl ether, hydroxyethyl vinyl ether, propyl vinyl ether, butyl vinyl ether, octyl vinyl ether, phenyl vinyl ether, etc.

(8) Vinyl esters such as vinyl acetate, vinyl chloroacetate, vinyl butyrate, vinyl benzoate, etc.

(9) Styrenes such as styrene, α-methylstyrene, chloromethylstyrene, etc.

(10) Vinyl ketones such as methyl vinyl ketone, ethyl vinyl ketone, phenyl vinyl ketone, etc.

(11) Olefins such as ethylene, propylene, isobutylene, butadiene, isoprene, etc.

(12) N-Vinylpyrrolidone, N-vinylcarbazole, 4-vinylpyridine, acrylonitrile, methacrylonitrile, etc.

(13) Unsaturated imides such as maleimide, N-acryloylacrylamide, N-acetylmethacrylamide, N-propionylmethacrylamide, N-(p-chlorobenzoyl) methacrylamide, etc.

(14) Unsaturated sulfonamides, e.g., methacrylamides such as N-(o-aminosulfonylphenyl)methacrylamide, N-(m-aminosulfonylphenyl)methacrylamide,N-(p-amino) sulfonylphenylmethacrylamide,N-[1-(3-aminosulfonyl) naphthyl]methacrylamide, N-(2-aminosulfonylethyl) methacrylamide, etc.; acrylamides each having the same substituent as described above; methacrylic acid esters such as o-aminosulfonylphenyl methacrylate, m-aminosulfonylphenyl methacrylate, p-aminosulfonylphenyl methacrylate, 1-(3-aminosulfonylnaphthyl) methacrylate, etc.; and acrylic acid esters each having the same substituent as described above.

(15) Unsaturated monomers each having a crosslinking group at the side chain, such as N-[2-(methacryloyloxy)-ethyl]-2,3-dimethylmaleimide, vinyl cinnamate, etc. Furthermore, the unsaturated monomer may be copolymerized with a monomer copolymerizable with the above-described monomer.

(16) Phenol resins described in U.S. Pat. No. 3,751,257 and polyvinylacetal resins such as polyvinyl formal resins, polyvinyl butyral resins, etc.

(17) The high molecular compounds obtained by alkali-solubilizing polyurethane described in JP-B-54-19773, JP-A-57-904747, JP-A-60-182437, JP-A-62-58242, JP-A-62-123452, JP-A-62-123453, JP-A-63-113450, and JP-A-2-146042.

Also, if necessary, to the above-described copolymers may be added a polyvinyl butyral resin, a polyurethane resin, a polyamide resin, an epoxy resin, a novolac resin, a natural resin, etc.

For the photosensitive composition which is formed on the support of the present invention, dye(s) can be used for obtaining visible images after light exposure and visible images after development.

Examples of the dye includes triphenylmethane series dyes, diphenylmethane series dyes, oxazine series dyes, xanthene series dyes, iminonaphthoquinone series dyes, azomethine series dyes, and anthraquinone dyes, such as, for example, Victoria Pure Blue BOH (trade name, made by HODOGAYA CHEMICAL CO., LTD.), Oil Blue #60 (trade name, made by Orient Kagaku Kogyo K. K.), Patent Pure Blue (trade name, made by Sumitomo Mikuni Kagaku K. K.), Crystal Violet, Brilliant Green, Ethyl Violet, Methyl Violet, Methyl Green, Erythrocin B, Basic Fuchsine, Malachite Green, Oil Red, m-cresol purple, Rhodamine B, Auramine, 4-p-diethylaminophenyliminaphthoquinone, and cyano-p-diethylaminophenyl acetanilide, which are examples of discoloring agent, which changes the color from a color to colorless or to a different color.

On the other hand, examples of the discoloring agent, which changes the color from colorless to a color, includes leuco dyes and primary and secondary arylamine series dyes such as triphenylamine, diphenylamine, o-chloroaniline, 1,2,3,-triphenylguanidine, naphthylamine, diaminodiphenylmethane, p,p'-bis-dimethylaminodiphenylamine, 1,2-dianilinoethylene, p,p', p"-tris-dimethylaminotriphenylmethane, p,p'-bis-dimethylaminodiphenylmethylimine, p,p',p"-triamino-o-methyltriphenylmethane, p,p'-bis-dimethylaminodiphenyl-4-anilinonaphthylmethane, and p,p',p"-triaminotriphenylmethane.

In these dyes, the triphenylmethane series dyes and the diphenylmethane series dyes are preferably used, the triphenylmethane series dyes are more preferably used, and Victoria Pure Blue BOH is most preferably used.

The photosensitive composition used in the present invention can further contain various additives.

For example, alkyl ethers (e.g., ethyl cellulose and methyl cellulose), fluorine series surface active agents, and nonionic surface active agents (in particular, the fluorine series surface active agents are preferred) for improving the coating property of the photosensitive composition; plasticizers (e.g., polyethylene glycol, tributyl citrate, diethyl phthalate, dibutyl phthalate, dihexyl phthalate, dioctyl phthalate, tricresyl phosphate, tributyl phosphate, trioctyl phthalate, tetrahydrofurfuryl oleate, and the oligomers or polymers of acrylic acid or methacrylic acid; and in these compounds, tricresyl phosphate is particularly preferred.) for imparting a flexibility and an abrasion resistance to the coated film; sensitizers (e.g., the half esterification product of a styrene-maleic anhydride copolymer with an alcohol described in JP-A-55-527, novolac resins such as p-t-butylphenol-formladehyde resin, etc., and the 50% fatty acid ester of p-hydroxystyrene) for improving the sensitivity of imaged portions; stabilizers (e.g., phosphoric acid, phosphorous acid, and organic acids such as citric acid, oxalic acid, dipicolinic acid, benzenesulfonic acid, naphthalene-sulfonic acid, sulfosalicylic acid, 4-methoxy-2-hydroxybenzophenone-5-sulfonic acid, tartaric acid, etc.); and development accelerators (e.g., higher alcohols and acid anhydrides) are preferably used.

For forming the above-described photosensitive composition on the support, a coating liquid of the photosensitive composition is prepared by dissolving the definite amounts of the photosensitive diazo resin, the oleophilic high molecular weight compound, and if necessary, various additives in a proper solvent (e.g., methyl cellosolve, ethyl cellosolve, dimethoxyethane, diethylene glycol monomethyl ether, diethylene glycol dimethyl ether, 1-methoxy-2-propanol, methyl cellosolve acetate, acetone, methyl ethyl ketone, methanol, methylformamide, dimethylacetamide, cyclohexanone, dioxane, tetrahydrofuran, methyl lactate, ethyl lactate, ethylene dichloride, dimethyl sulfoxide, water, and a mixture thereof) and the coating liquid may be coated on the support and dried.

The solvent used may be singly but a mixture of a high-boiling solvent such as methyl cellosolve, 1-methoxy-2-propanol, methyl lactate, etc., and a low-boiling solvent such as methanol, methyl ethyl ketone, etc., is more preferably used.

It is preferred that the solid component concentration of the photosensitive composition at coating is in the range of from 1 to 50% by weight. In this case, the coating amount (the coverage) of the photosensitive composition is generally from 0.2 to 10 g/m$^2$ (dry amount), and preferably from 0.5 to 3 g/m$^2$.

[III] The Case of Forming a Photosensitive Layer Containing a Photodimerizable Photosensitive Composition and a Photopolymerizable Photosensitive Composition As the photodimerizable photosensitive composition, there are polymers each having a maleimide group, a cinnamoyl group, a cinnamylidene group, a cinnamylideneacetyl group, a chalcone group, etc., at the side chain or the principal chain. As the polymer having a maleimide group at the side chain, there are the polymers described in U.S. Pat. No. 4,079,041, German Patent 2,626,769, EP 21,019, EP 3,552, and Die Angewandte Makromolekulare Chemie, 115, 163–181(1983) and also the polymers described in JP-A-49-128991, JP-A-49-128992, JP-A-49-128993, JP-A-50-5376, JP-A-50-5377, JP-A-50-5378, JP-A-50-5379, JP-A-50-5380, JP-A-53-5298, JP-A-53-5299, JP-A-53-5300, JP-A-50-50107, JP-A-51-47940, JP-A-52-13907, JP-A-50-45076, JP-A-52-121700, JP-A-50-10884, JP-A-50-45087, German Patents 2,349,948 and 2,616,276.

To make these polymers dissolvable in or swellable with an aqueous alkali solution, it is useful to add a carboxylic acid, sulfonic acid, phosphoric acid, phosphonic acid or the metal salt or the ammonium salt of the acid, or a acid group having pKa of from 6 to 12, which dissociates with an aqueous alkali solution to the polymers. If necessary, a monomer having the above-described acid group can be copolymerized with the monomer having a maleimide group.

The acid value of the maleimide polymer having the acid group is preferably in the range of from 30 to 300 and in the polymers having the above-described acid value, the copolymer of N-[2-(methacryloyloxy)ethyl]-2,3-dimethylmaleimide and methacrylic acid or acrylic acid as described in Die Angewandte Makromolekulare Chemie, 128, 71–91(1983) is useful. Furthermore, at the synthesis of the copolymer, by copolymerizing with a vinyl monomer as a 3rd component, a multi-component copolymer can be easily synthesized. For example, by using an alkyl methacrylate or an alkyl acrylate, the glass transition point of the homopolymer of which is lower than room temperature, as the vinyl monomer as the 3rd component, a flexibility can be imparted to the copolymer.

As a photocrosslinkable polymer having a cinnamyl group, a cinnamoyl group, a cinnamylidene group, a cinnamylideneacetyl group, a chalcone group, etc., at the side chain or the principal chain, there are photosensitive polyesters described in U.S. Pat. No. 3,030,208, U.S. patent application Ser. Nos. 709,496 and 828,455.

As the photocrosslinkable polymers which are rendered soluble in an aqueous alkali solution, there are following polymers.

That is, there are photosensitive polymers as described in JP-A-60-191244. Furthermore, there are photosensitive polymers described in JP-A-62-175729, JP-A-62-175730, JP-A-63-25443, JP-A-63-218944, and JP-A-63-218945.

Also, for the photosensitive layers containing these polymers, a sensitizer can be used and such a sensitizer includes benzophenone derivatives, benzanthrone derivatives, quinones, aromatic nitro compounds, naphthothiazoline derivatives, benzothiazoline, derivatives, thioxanthones, naphthothiazole derivatives, ketocoumarin compounds, benzothiazole derivatives, naphthofuranone compounds, pyrylium salts, thiapyrylium salts, etc.

If necessary, for the photosensitive layer, a binder such as chlorinated polyethylene, chlorinated polypropylene, a polyacrylic acid alkyl ester, a copolymer with at least one monomer of an acrylic acid alkyl ester, acrylonitrile, vinyl chloride, styrene, butadiene, etc., polyamide, methyl cellulose, polyvinyl formal, polyvinyl butyral, a methacrylic acid copolymer, an acrylic acid copolymer, an itaconic acid copolymer, etc., and a plasticizer such as a phthalic acid dialkyl ester (e.g., dibutyl phthalate and dihexyl phthalate), an oligoethylene glycol alkyl ester, a phosphoric acid ester, etc., can be used.

Also, it is preferred to add a dye or pigment or a pH indicator as a printout solution to the photosensitive layer for coloring the photosensitive layer.

The photopolymerizable photosensitive composition includes an unsaturated carboxylic acid and a salt thereof, an ester of an unsaturated carboxylic acid and an aliphatic polyhydric alcohol, and an amide of an unsaturated carboxylic acid and an aliphatic polyvalent amine.

The photopolymerization initiator includes a vicinal compound, an α-carbonyl compound, acyloin ether, an aromatic acyloin compound substituted by a hydrocarbon group at the α-position, a polynuclear quinone compound, a combination of a triallyl imidazole dimer and p-aminophenyl ketone, a benzothiazole series compound, a trihalomethyl-s-triazine compound, an acridine compound, a phenazine compound, an oxadiazole compound, etc.

The high molecular weight polymer which is soluble in or swellable with an aqueous alkali solution together with the above-described compounds and can form a film includes a copolymer of benzyl (meth)acrylate, (meth)acrylic acid, and, if necessary, other addition polymerizable vinyl monomer, a copolymer of methacrylic acid and methyl methacrylate (or other methacrylic acid ester), an acidic vinyl copolymer by adding pentaerythritol triacrylate to a maleic anhydride copolymer by a half esterification reaction, etc.

[IV] Electrophotographic Photosensitive Layer

For example, an ZnO photosensitive layer disclosed in U.S. Pat. No. 3,001,872 can be also used. Also, the photosensitive layer using an electrophotographic photoreceptor described in JP-A-56-161550, JP-A-60-186847, JP-A-61-238063, etc., can be used.

The amount of the photosensitive layer formed on the support is in the range of from about 0.1 to 7 g/m$^2$, and preferably from 0.5 to 4 g/m$^2$.

In the production method of the support for a lithographic printing plate in the present invention, if necessary, an intermediate layer may be formed on the support for increasing the adhesion between the support and the photosensitive layer, for not leaving the residue of the photosensitive layer after development, and for preventing halation.

To improve the adhesion, the intermediate layer generally comprises a diazo resin and a phosphoric acid compound, an amino compound, a carboxylic acid compound, etc., each adsorbing onto an aluminum plate. The intermediate layer comprising a material having a high solubility such that the photosensitive layer does not remain after development generally comprises a polymer having a good solubility or a water-soluble polymer. Furthermore, for the halation prevention, the intermediate layer generally contains a dye or an ultraviolet absorbent.

The thickness of the intermediate layer may be optional but it must be a thickness capable of carrying out a uniform bonding forming reaction with the photosensitive layer as the upper layer at light exposure. The thickness is usually from about 1 to 100 mg/m$^2$, and preferably from 5 to 40 mg/m$^2$ as the dry solid component coverage.

On the photosensitive layer coated, a matting layer having fine projections formed thereon independently with each other may be provided.

The purpose of the matting layer is to shorten the evacuating time for contacting a negative image film and the photosensitive lithographic printing plate and to prevent the occurrence of crushing of fine dots at light exposure caused by an inferior adhesion by improving the vacuum contact property of the negative image film and the photosensitive lithographic printing plate in a contact exposure.

As a coating method of the matting layer, there are a method of heat-welding solid powders described in JP-A-55-12974, a method of spraying polymer-containing water followed by drying described in JP-A-58-182636, etc. In this case, it is preferred that the matting layer itself is dissolved in an aqueous alkaline developer containing substantially no organic solvent or is removed by the aqueous alkaline developer.

The photosensitive lithographic printing plate thus prepared is image-exposed and treated including a development by an ordinary manner, whereby resin images are formed on the printing plate. For example, in the case of the photosensitive lithographic printing plate having the photosensitive layer [1] described above, after image exposure, by developing an aqueous alkali solution as described in U.S. Pat. No. 4,259,434, the light-exposed portions are removed to provide a lithographic printing plate, and in the case of the photosensitive lithographic printing plate having the photosensitive layer [II] described above, after image exposure, by developing with the developer as described in U.S. Pat. No. 4,186,006, the photosensitive layer is removed at the unexposed portions to provide a lithographic printing plate. Also, the aqueous alkali developer composition used for developing a positive-type lithographic printing plate as described in JP-A-59-84241, JP-A-57-192952, and JP-A-62-24263 can be used.

The following examples are intended to illustrate the present invention in more detail but not to limit it in any way.

EXAMPLES 1 TO 6

An aluminum plate of JIS 1050 material was subjected to mechanical graining using the apparatus described in JP-B-50-40047 at a rotation number of the roll brush of 250 r.p.m., while changing the bristle nerve of the brush and the particle size of abrasive to obtain the desired properties. Thereafter, the aluminum plate was washed with water and subjected to the 1st chemical etching treatment. In the 1st chemical etching treatment, the concentration of an aqueous sodium hydroxide was maintained at a constant value of 25%, the liquid temperature was 55° C., and the treatment time was controlled such that the etching amount became the value shown in Table 1 below. Thereafter, the plate was washed with water and subjected to a desmutting treatment and then subjected to the 1st electrochemical graining treatment by the power source wave form described in JP-A-3-79799 at a nitric acid concentration of 15 g/liter, an aluminum concentration of 6 g/liter, and a liquid temperature of 40° C. such that the anode quantity of electricity became the quantity of electricity shown in Table 1 below. Then, the aluminum plate was subjected to a cathode electrolysis using the same liquid as in the 1st electrochemical graining treatment at a quantity of electricity of 10% of the quantity of electricity in the 1st electrochemical graining treatment. Thereafter, the aluminum plate was subjected to the 2nd electrochemical graining treatment by the power source wave form described in JP-A-3-79799, at a nitric acid concentration of 12 g/liter, an aluminum concentration of 5 g/liter, and a liquid temperature of 40° C. such that the anode quantity of electricity became the quantity of electricity shown in Table 1 below. After washing with water, the aluminum plate was subjected to the 2nd chemical etching treatment. In this case, the concentration of the aqueous sodium hydroxide solution was the same as in the 1st chemical etching treatment, the liquid temperature was 40° C., and the treatment time was controlled such that the etching amount became the value shown in Table 1. Thereafter, the aluminum plate was washed with water and subjected to a desmutting treatment. Then, the aluminum plate was subjected to an anodic oxidation treatment at a sulfuric acid concentration of 120 g/liter and a liquid temperature of 45° C. to form an anodic oxidation film on the aluminum plate at a coverage of 3.0 g/m$^2$. Thereafter, the surface of the aluminum plate was measured by the AFL (manufactured by Seiko Instruments Inc.).

The measurement results are shown in Table 1 below.

TABLE 1

| | Surface Treatment Condition | | | | AFM Measurement Result | | |
|---|---|---|---|---|---|---|---|
| | (A) (g/m$^2$) | (B) (C/dm$^2$) | (C) (C/dm$^2$) | (D) (g/m$^2$) | (E) ($\mu$m) | (F) ($\mu$m) | (G) |
| Ex. 1 | 6 | 60 | 70 | 0.5 | 0.21 | 0.41 | 2.0 |
| Ex. 2 | 9 | 100 | 120 | 0.4 | 0.39 | 0.59 | 1.5 |
| Ex. 3 | 8 | 90 | 70 | 0.9 | 0.32 | 0.78 | 2.4 |
| Ex. 4 | 5 | 60 | 55 | 1.1 | 0.20 | 0.60 | 3.0 |
| Ex. 5 | 8 | 110 | 110 | 0.4 | 0.40 | 0.98 | 2.5 |
| Ex. 6 | 3 | 65 | 70 | 0.3 | 0.21 | 0.62 | 3.0 |

In the above table:
(A): 1st Chemical etching
(B): 1st Electrochemical graining
(C): 2nd Electrochemical graining
(D): 2nd Chemical etching
(E): R$_{ms}$ (1 to 10 $\mu$m)
(F): R$_{ms}$ (10 to 100 $\mu$m)
(G); R$_{ms}$ (10 to 100 $\mu$m)/R$_{ms}$ (1 to 10 $\mu$m)
Ex.: Example

EXAMPLES 7 AND 8

An aluminum plate was subjected to a degreasing treatment at a constant concentration of an aqueous sodium hydroxide solution of 25% and a liquid temperature of 55° C. and thereafter washed with water and subjected to a desmutting treatment. Then, the aluminum plate was subjected to the 1st electrochemical graining treatment by a power source wave form described in JP-A-3-79799, at a nitric acid concentration of 15 g/liter, an aluminum concentration of 6 g/liter, and a liquid temperature of 40° C. such that the anode quantity of electricity became the quantity of electricity shown in Table 2 below and thereafter, the aluminum plate was subjected to the 1st chemical etching treatment with an aqueous sodium hydroxide solution having a concentration of 25% such that the etching amount became the value shown in Table 2. Thereafter, the aluminum plate was subjected to the 2nd electrochemical graining treatment by the power source wave form described in JP-A-3-79799, at a nitric acid concentration of 12 g/liter, at an aluminum concentration of 5 g/liter, and at a liquid temperature of 40° C. such that the anode quantity of electricity became the quantity of electricity shown in Table 2 below, and after washing with water, the aluminum plate was subjected to the 2nd chemical etching treatment. In the 2nd chemical etching treatment, the concentration of an aqueous sodium hydroxide was the same as that in the 1st chemical etching treatment, the liquid temperature was 40° C., and the treatment time was controlled such that the etching amount became the value shown in Table 2. Then, the aluminum plate was washed with water, subjected to a desmutting treatment, and subjected to an anodic oxidation treatment at a sulfuric acid concentration of 120 g/liter and at a liquid temperature of 45° C. to form an anodic oxidation film at a coverage of 3.0 g/m$^2$. Thereafter, the surface of the aluminum plate thus treated was measured by the AFL. The measurement results are shown in Table 2 below.

TABLE 2

| | Surface Treatment Condition | | | | AFM Measurement Result | | |
|---|---|---|---|---|---|---|---|
| | (A) (g/m$^2$) | (B) (C/dm$^2$) | (C) (C/dm$^2$) | (D) (g/m$^2$) | (E) ($\mu$m) | (F) ($\mu$m) | (G) |
| Ex. 7 | 2 | 850 | None | None | 0.21 | 0.59 | 2.8 |
| Ex. 8 | 6 | 380 | 185 | 0.4 | 0.26 | 0.68 | 2.6 |

(A) to (G) and Ex. are the same meanings as in Table 1.

Comparative Examples 1 to 6

An aluminum plate of JIS 1050 material was subjected to mechanical graining using the apparatus described in JP-B-50-40047 at a rotation number of the roll brush of 250 r.p.m., while changing the bristle nerve of the brush and the particle size of abrasive to obtain the desired properties. Thereafter, the aluminum plate was washed with water and subjected to the 1st chemical etching treatment. In the 1st chemical etching treatment, the concentration of an aqueous sodium hydroxide was maintained at a constant value of 25%, the liquid temperature was 55° C., and the treatment time was controlled such that the etching amount became the value shown in Table 3 below. Thereafter, the aluminum plate was washed with water and subjected to a desmutting treatment and then subjected to the 1st electrochemical graining treatment by the power source wave form described in JP-A-3-79799 at 60 Hz. at a nitric acid concentration of 15 g/liter, an aluminum concentration of 6 g/liter, and a liquid temperature of 40° C. such that the anode quantity of electricity became the quantity of electricity shown in Table 3 below. Then, the aluminum plate was subjected to a cathode electrolysis at a quantity of electricity of 10% of the quantity of electricity in the 1st electrochemical graining treatment. Thereafter, the aluminum plate was subjected to the 2nd electrochemical graining treatment by the power source wave form described in JP-A-3-79799, at 60 Hz, at a nitric acid concentration of 12 g/liter, an aluminum concentration of 5 g/liter, and a liquid temperature of 40° C. such that the anode quantity of electricity became the quantity of electricity shown in Table 3 below. After washing with water, the aluminum plate was subjected to the 2nd chemical etching treatment. In this case, the concentration of the aqueous sodium hydroxide solution was the same as in the 1st chemical etching treatment, and the treatment time was controlled such that the etching amount became the value shown in Table 3. Thereafter, the aluminum plate was washed with water and subjected to a desmutting treatment. Then, the aluminum plate was subjected to an anodic oxidation treatment at a sulfuric acid concentration of 120 g/liter and a liquid temperature of 45° C. to form an anodic oxidation film on the aluminum plate at a coverage of 3.0 g/m$^2$. Thereafter, the surface of the aluminum plate was measured by the AFL. The measurement results are shown in Table 3 below.

TABLE 3

| | Surface Treatment Condition | | | | AFN Measurement Result | | |
|---|---|---|---|---|---|---|---|
| | (A) (g/m²) | (B) (C/dm²) | (C) (C/dm²) | (D) (g/m²) | (E) (μm) | (F) (μm) | (G) |
| C. Ex. 1 | 7 | 60 | 70 | 0.5 | 0.21 | 0.66 | 3.1 |
| C. Ex. 2 | 9 | 60 | 80 | 0.4 | 0.22 | 0.38 | 1.7 |
| C. Ex. 3 | 18 | 90 | 70 | 0.9 | 0.39 | 1.05 | 2.7 |
| C. Ex. 4 | 6 | 30 | 25 | 1.1 | 0.18 | 0.48 | 2.7 |
| C. Ex. 5 | 7 | 85 | 95 | 0.4 | 0.42 | 0.97 | 2.3 |
| C. Ex. 6 | 8 | 65 | 70 | 0.3 | 0.38 | 0.53 | 1.4 |

(A) to (G) are the same as in Table 1.
C. Ex.: Comparative Example.

Comparative Examples 7 and 8

An aluminum plate was subjected to a degreasing treatment at a constant concentration of an aqueous sodium hydroxide solution of 25% and a liquid temperature of 55° C. and thereafter washed with water and subjected to a desmutting treatment. Then, the aluminum plate was subjected to the 1st electrochemical graining treatment by a power source wave form described in JP-A-3-79799, at a nitric acid concentration of 15 g/liter, an aluminum concentration of 6 g/liter, and a liquid temperature of 40° C. such that the anode quantity of electricity became the quantity of electricity shown in Table 4 below and. thereafter, the aluminum plate was subjected to the 1st chemical etching treatment with an aqueous sodium hydroxide solution having a concentration of 25% such that the etching amount became the value shown in Table 4. Thereafter, the aluminum plate was subjected to the 2nd electrochemical graining treatment by the power source wave form described in JP-A-3-79799, at a nitric acid concentration of 12 g/liter, at an aluminum concentration of 5 g/liter, and at a liquid temperature of 40° C. such that the anode quantity of electricity became the quantity of electricity shown in Table 4 below, and after washing with water, the aluminum plate was subjected to the 2nd chemical etching treatment. In the 2nd chemical etching treatment, the concentration of an aqueous sodium hydroxide was the same as that in the 1st chemical etching treatment, the liquid temperature was 40° C., and the treatment time was controlled such that the etching amount became the value shown in Table 4. Then, the aluminum plate was washed with water, subjected to a desmutting treatment, and subjected to an anodic oxidation treatment at a sulfuric acid concentration of 120 g/liter and at a liquid temperature of 45° C. to form an anodic oxidation film at a coverage of 3.0 g/m². Thereafter, the surface of the aluminum plate thus treated was measured by the AFL. The measurement results are shown in Table 4 below.

TABLE 4

| | Surface Treatment Condition | | | | AFM Measurement Result | | |
|---|---|---|---|---|---|---|---|
| | (A) | (B) | (C) | (D) | (E) | (F) | (G) |
| C. Ex. 7 | 3 | 1300 | None | None | 0.39 | 1.16 | 3.0 |
| C. Ex. 8 | 6 | 350 | 60 | 0.7 | 0.18 | 0.52 | 2.9 |

(A) to (G) are the same as in Table 1.
C. Ex.: Comparative Example

Comparative Examples 9 to 11

The aluminum plate of the JIS 1050 material was subjected to a degreasing treatment with an aqueous 6% sodium hydroxide solution for 7 seconds at 65° C. and after washing with water, the aluminum plate was immersed in an aqueous 30% sulfuric acid solution for 15 seconds and then washed with water. The aluminum plate was subjected to an electrochemical graining treatment by the power source wave form described in JP-A-3-79799, at 60 Hz and 50 A/dm², such that the anode quantity of electricity became the quantity of electricity shown in Table 5 below, immersed in an aqueous 5% sodium hydroxide solution at 30° C., and after washing with water, the aluminum plate was subjected to a desmutting treatment with an aqueous sulfuric acid solution. In this case, the immersion time was controlled such the etching amount became the value shown in Table 5. Thereafter, the aluminum plate was subjected to an anodic oxidation treatment at a sulfuric acid concentration of 120 g/liter and a liquid temperature of 45° C. to form an anodic oxidation film at a coverage of 3.0 g/m². Thereafter, the surface of the aluminum plate thus treated was measured by the AFL. The measurement results are shown in Table 5 below.

TABLE 5

| | Surface Treatment Condition | | AFM Measurement Result | | |
|---|---|---|---|---|---|
| | (A') (C/dm²) | (B') (g/m²) | (E) (μm) | (F) (μm) | (G) |
| C. Ex. 9 | 800 | 1.0 | 0.36 | 0.50 | 1.4 |
| C. Ex. 10 | 1800 | 1.4 | 0.38 | 1.1 | 2.9 |
| C. Ex. 11 | 450 | 0.2 | 0.22 | 0.68 | 3.1 |

(A'): Electrochemical graining
(B'): Chemical etching
(E), (F), and (G) are the same as in Table 1.
C. Ex.: Comparative Example Each of the aluminum plates thus prepared was coated with the following photosensitive composition at a dry coverage of 2.0 g/m² to form a photosensitive layer and further mat coating was applied thereon to provide a photosensitive lithographic printing plate.

(Photosensitive Layer Composition)

| | |
|---|---|
| Ester compound of naphthoquinone-1,2-diazido-5-sulfonyl chloride, pyrogallol, and an acetone resin (described in Example 1 of U.S. Pat. No. 3,635,709) | 0.075 g |
| Cresol-novolac resin | 2.00 g |
| Oil Blue 603 (made by Orient Kagaku K.K.) | 0.04 g |
| Ethylene dichloride | 16 g |
| 2-Methoxyethyl acetate | 12 g |

The results of conforming the printing performance of each photosensitive lithographic printing plate are shown in Table 6 below.

TABLE 6

| | (H) | (I) | (J) | (K) |
|---|---|---|---|---|
| Example 1 | ○ | ⊚ | 80,000 | ○ |
| Example 2 | ○ | ⊚○ | 90,000 | ○ |
| Example 3 | ○ | ○ | 70,000 | ○ |
| Example 4 | ○ | ○ | 70,000 | ○ |
| Example 5 | ⊚ | ○Δ | 90,000 | ○ |
| Example 6 | ○Δ | ○ | 90,000 | ○ |
| Example 7 | ○Δ | ○ | 80,000 | ○ |
| Example 8 | ○ | ○ | 90,000 | ○ |

TABLE 6-continued

|  | (H) | (I) | (J) | (K) |
|---|---|---|---|---|
| C. Example 1 | ○Δ | x | 60,000 | ○ |
| C. Example 2 | x | ○Δ | 70,000 | x |
| C. Example 3 | ○ | x | NG (40,000) | ○ |
| C. Example 4 | ○ | ○ | NG (40,000) | ○ |
| C. Example 5 | ○ | x | 60,000 | ○ |
| C. Example 6 | x | ○ | 90,000 | x |
| C. Example 7 | ○ | x | NG (30,000) | ○ |
| C. Example 8 | x | ○Δ | 70,000 | x |
| C. Example 9 | x | ○ | 80,000 | ○ |
| C. Example 10 | Δx | ○ | NG (35,000) | ○ |
| C. Example 11 | xx | ○ | 70,000 | ○ |

(H): Hardness of staining of dot portions
(I): Hardness of staining of blanket
(J): Printing compression
(K): Easiness of seeing lesser amount of fountain solution on a printing plate
C. Example: Comparative Example
NG: No good (region which cannot be used as a lithographic printing plate)

As described above, the lithographic printing plate of the present invention has the feature that the $R_{ms}$(1 to 10 μm) and the $R_{ms}$(10 to 100 μm) by the AFL are prescribed and has remarkably improved characteristics such as the hardness to be stained, the printability, the printing impression, etc.

While the invention has been described in detail and with reference to specific embodiments thereof, it will be apparent to one skilled in the art that various changes and modifications can be made therein without departing from the spirit and scope thereof.

What is claimed is:

1. A precursor for a lithographic printing plate comprising a support and a layer of a photosensitive composition, said support being subjected to at least two separate graining treatments wherein the surface of said support simultaneously satisfies the ranges shown by following (1), (2), and (3);

$$1.5 \leq R_{ms}(10 \text{ to } 100 \text{ μm})/R_{ms}(1 \text{ to } 10 \text{ μm}) \leq 3.0 \quad (1)$$

$$0.2 \leq R_{ms}(1 \text{ to } 10 \text{ μm}) \leq 0.4 \text{ [μm]} \quad (2)$$

$$0.4 \leq R_{ms}(10 \text{ to } 100 \text{ μm}) \leq 1.0 \text{ [μm]} \quad (3)$$

wherein the $R_{ms}$ is the square average surface roughness obtained by measuring the surface form of the support by the AFL (Atomic Force Microscope), the $R_{ms}$(1 to 10 μm) shows the value about the frequency space of from 1 to 10 μm, and the $R_{ms}$(10 to 100 μm) shows the value about the frequency space of from 10 to 100.

* * * * *